United States Patent
Bulford

(12) 
(10) Patent No.: US 6,329,601 B1
(45) Date of Patent: Dec. 11, 2001

(54) SERVICE WIRE SPLICE HOUSING

(76) Inventor: David L. Bulford, 1489 Bear Creek Road, Kelowna, British Columbia (CA), V1Z 2S2

( * ) Notice: Subject to any disclaimer, the term of this patent is extended or adjusted under 35 U.S.C. 154(b) by 0 days.

(21) Appl. No.: 09/437,749

(22) Filed: Nov. 10, 1999

Related U.S. Application Data

(63) Continuation-in-part of application No. 08/876,217, filed on Jun. 16, 1997, now abandoned.
(60) Provisional application No. 60/019,834, filed on Jun. 17, 1996.

(51) Int. Cl.[7] .................................................. H02G 15/06
(52) U.S. Cl. ........................................................... 174/91
(58) Field of Search .................................. 174/91, 93, 87, 174/76, 75 R, 77 R

(56) References Cited

U.S. PATENT DOCUMENTS

| | | | |
|---|---|---|---|
| 3,209,069 | * 9/1965 | Ruddell et al. | 174/91 X |
| 3,395,382 | * 7/1968 | Weagant | 174/91 X |
| 3,874,760 | * 4/1975 | Guthmiller et al. | 174/91 X |
| 3,935,373 | * 1/1976 | Smith et al. | 174/77 R |
| 3,951,503 | * 4/1976 | Caulkins | 174/91 X |
| 3,991,264 | 11/1976 | Connell | 174/38 |
| 4,039,742 | 8/1977 | Smith | 174/87 |
| 4,181,814 | 1/1980 | Smith | 174/92 |
| 4,262,167 | 4/1981 | Boaard et al. | 174/92 |
| 4,295,005 | 10/1981 | Daugherty et al. | 174/92 |
| 4,314,094 | 2/1982 | Smith | 174/78 |
| 4,337,374 | 6/1982 | Smith | 174/138 |
| 4,424,412 | 1/1984 | Goeter et al. | 174/92 |
| 4,435,612 | 3/1984 | Smith | 174/92 |
| 4,549,040 | 10/1985 | Goetter | 174/92 |
| 4,554,401 | 11/1985 | Ball | 174/37 |
| 4,570,032 | 2/1986 | Charlebois et al. | 174/84 |
| 4,679,896 | 7/1987 | Krafcik et al. | 350/96.2 |
| 4,737,600 | 4/1988 | Mathis et al. | 174/87 |
| 4,740,653 | 4/1988 | Hellbusch | 174/21 |
| 4,799,575 | 1/1989 | Goetter | 350/96.2 |
| 4,810,829 | 3/1989 | Rutenbeck et al. | 174/41 |
| 4,839,473 | 6/1989 | Fox et al. | 174/138 |
| 4,885,432 | 12/1989 | Amoyal et al. | 174/92 |
| 4,902,855 | 2/1990 | Smith | 174/77 |
| 4,924,034 | 5/1990 | Truesdale et al. | 174/87 |
| 4,932,744 | 6/1990 | Messelhi | 350/96.2 |
| 4,935,582 | 6/1990 | Calligaris | 174/92 |
| 5,001,300 | 3/1991 | Messelhi | 174/87 |
| 5,038,003 | 8/1991 | Allec et al. | 174/138 |
| 5,055,636 | 10/1991 | Jaycox | 174/87 |
| 5,059,748 | 10/1991 | Allen et al. | 174/87 |
| 5,111,001 | 5/1992 | Jervis | 174/92 |
| 5,142,661 | 8/1992 | Grant et al. | 385/135 |
| 5,215,607 | 6/1993 | Read et al. | 156/56 |
| 5,235,134 | 8/1993 | Jaycox | 174/87 |
| 5,245,133 | 9/1993 | DeCarlo et al. | 174/93 |
| 5,245,151 | 9/1993 | Chamberlain et al. | 219/10.57 |
| 5,252,779 | 10/1993 | DiRienzo | 174/87 |
| 5,322,973 | 6/1994 | Dagan | 174/92 |
| 5,323,480 | 6/1994 | Mullaney et al. | 385/135 |
| 5,347,084 | * 9/1994 | Roney et al. | 174/93 X |
| 5,371,323 | 12/1994 | Schneider et al. | 174/92 |
| 5,382,756 | 1/1995 | Dagan | 174/92 |
| 5,387,763 | 2/1995 | Messelhi | 174/92 |
| 5,397,859 | 3/1995 | Robertson et al. | 174/92 |
| 5,517,592 | * 5/1996 | Grajewski et al. | 174/77 R X |
| 5,589,666 | * 12/1996 | DeCarlo et al. | 174/87 |
| 5,610,369 | * 3/1997 | Foss | 174/91 X |

* cited by examiner

*Primary Examiner*—Chau N. Nguyen
(74) *Attorney, Agent, or Firm*—Antony C. Edwards

(57) ABSTRACT

A service wire splice housing has an upper cap having a cavity therein and a lower aperture communicating with the cavity releasably securable for watertight releasably resealable mating onto a base, the base having a cavity extending between an upper aperture corresponding to the aperture in the cap, when the cap is releasably mated onto the base, and hollow telephone service wire receptacles extending from the base, the telephone service wire receptacles adapted to be watertight when service wires are journalled therethrough so as to extend through the cavity in the base and into the cavity in the cap wherein the service wires may be spliced.

12 Claims, 7 Drawing Sheets

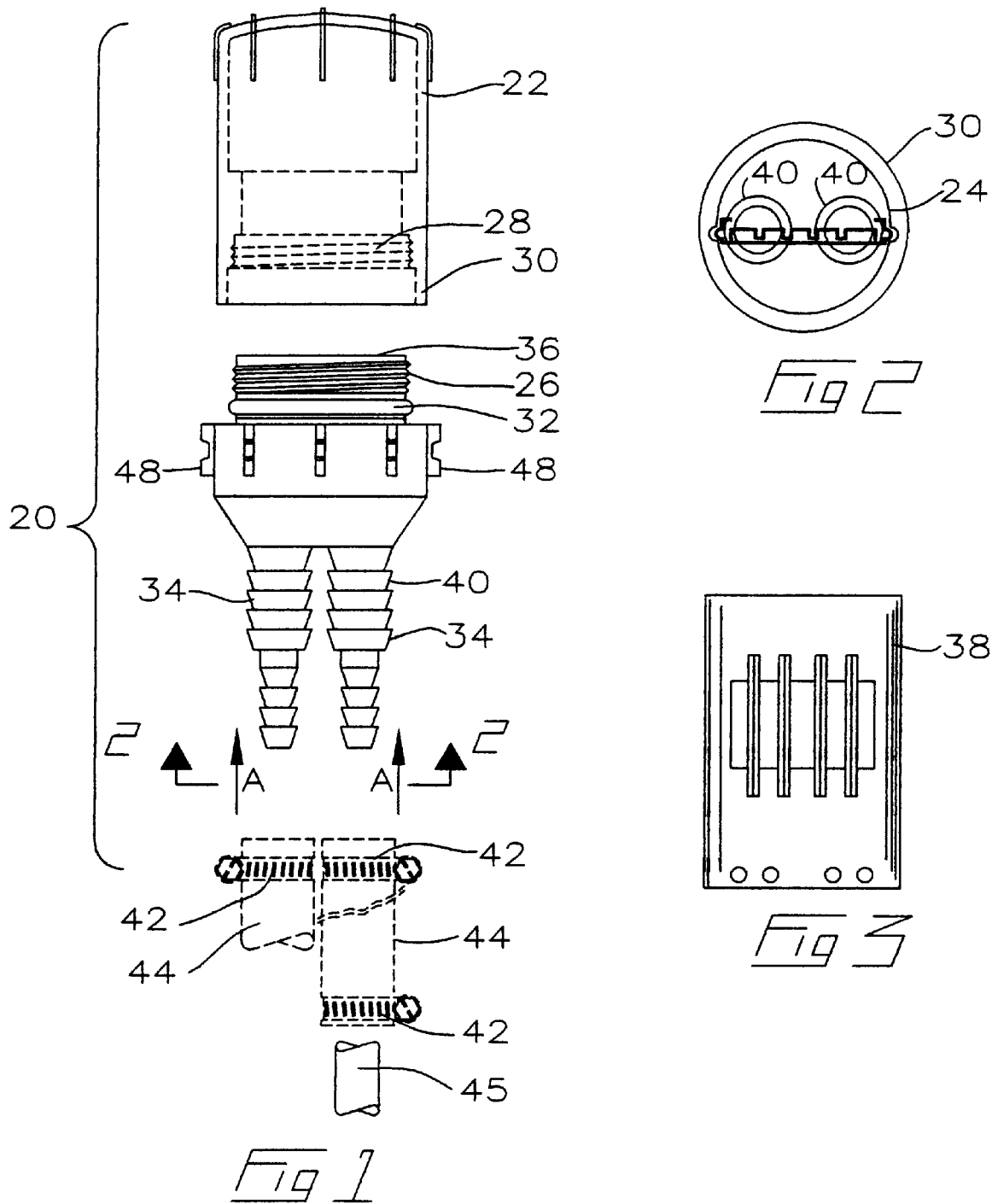

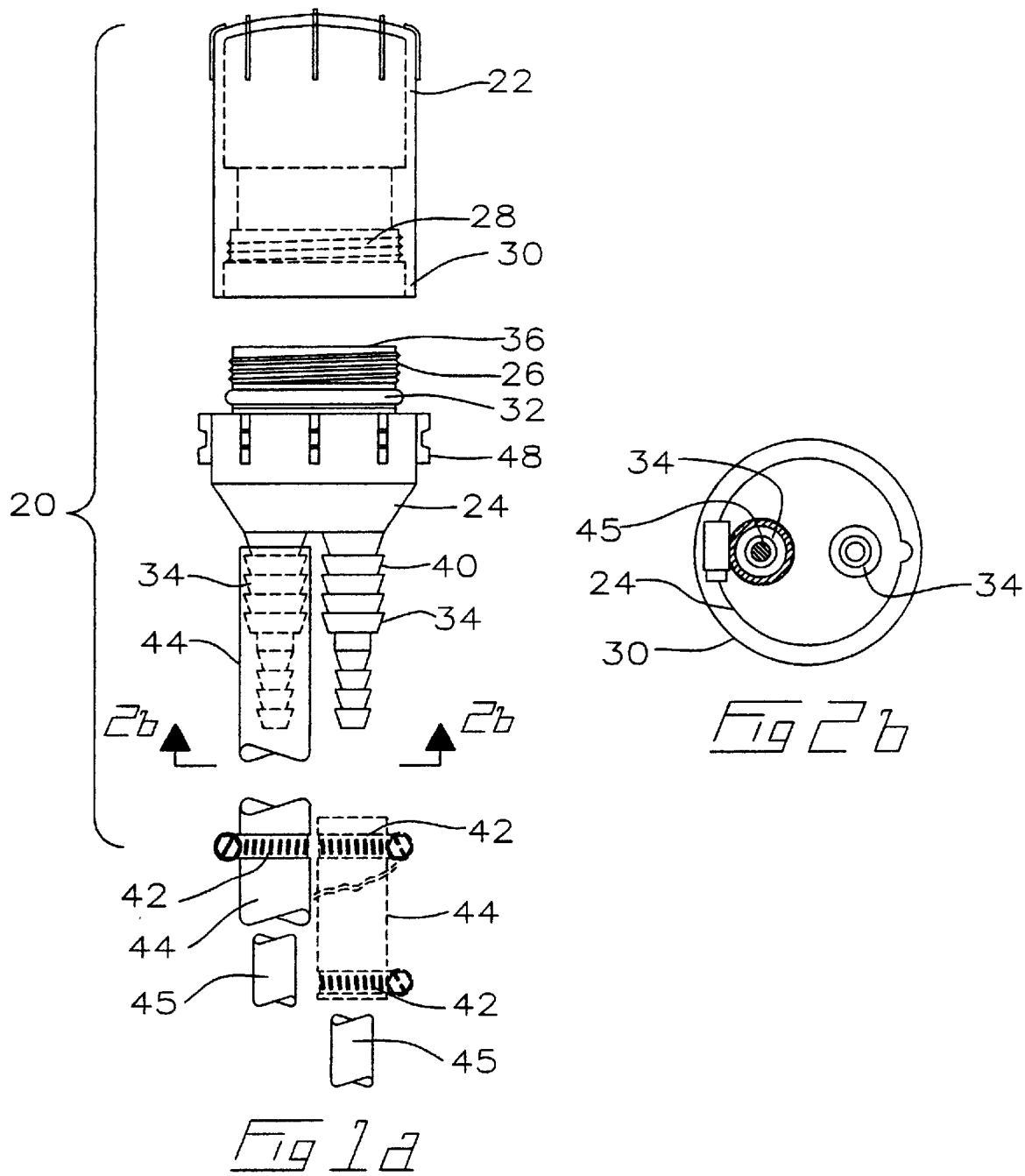

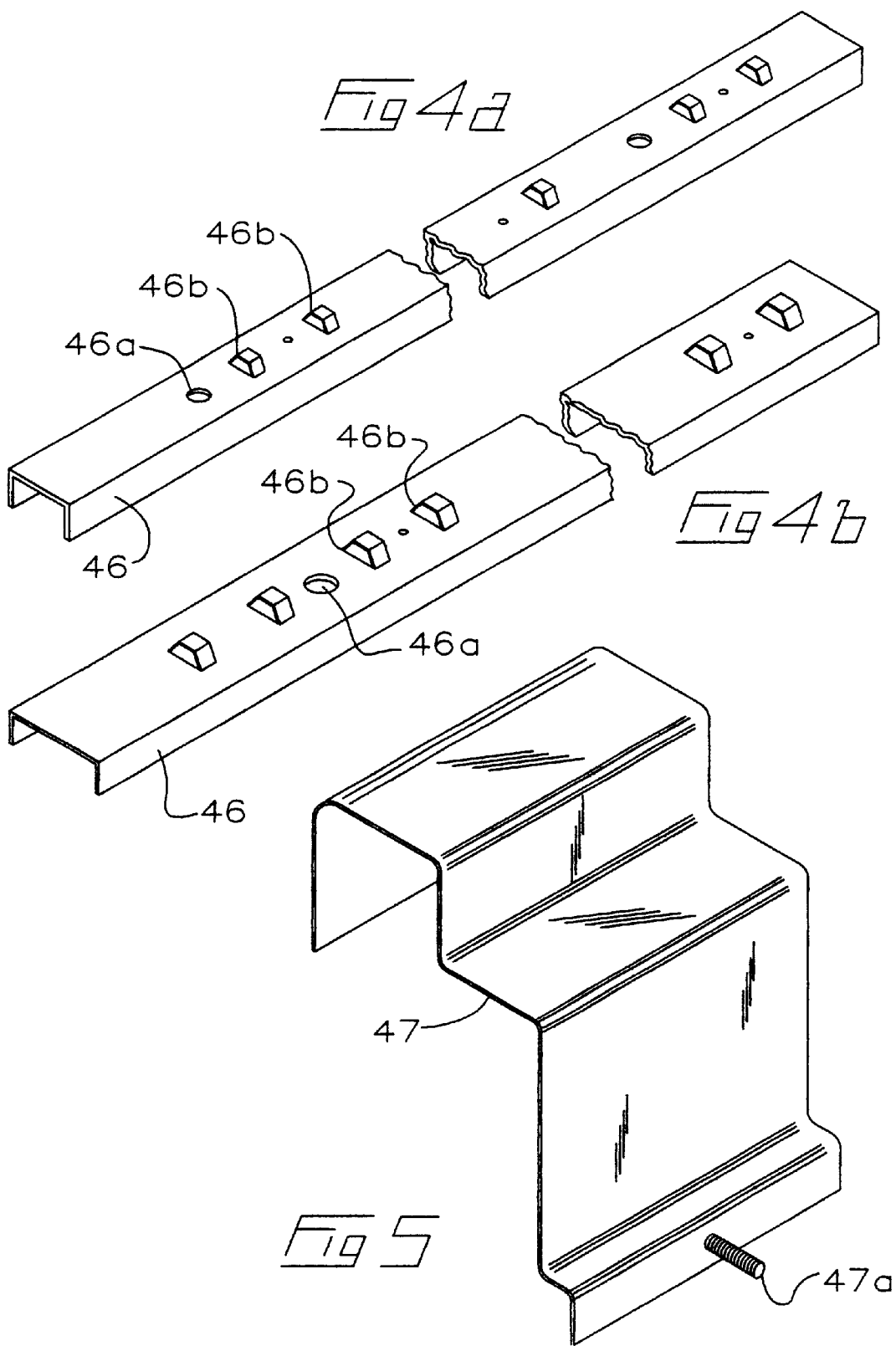

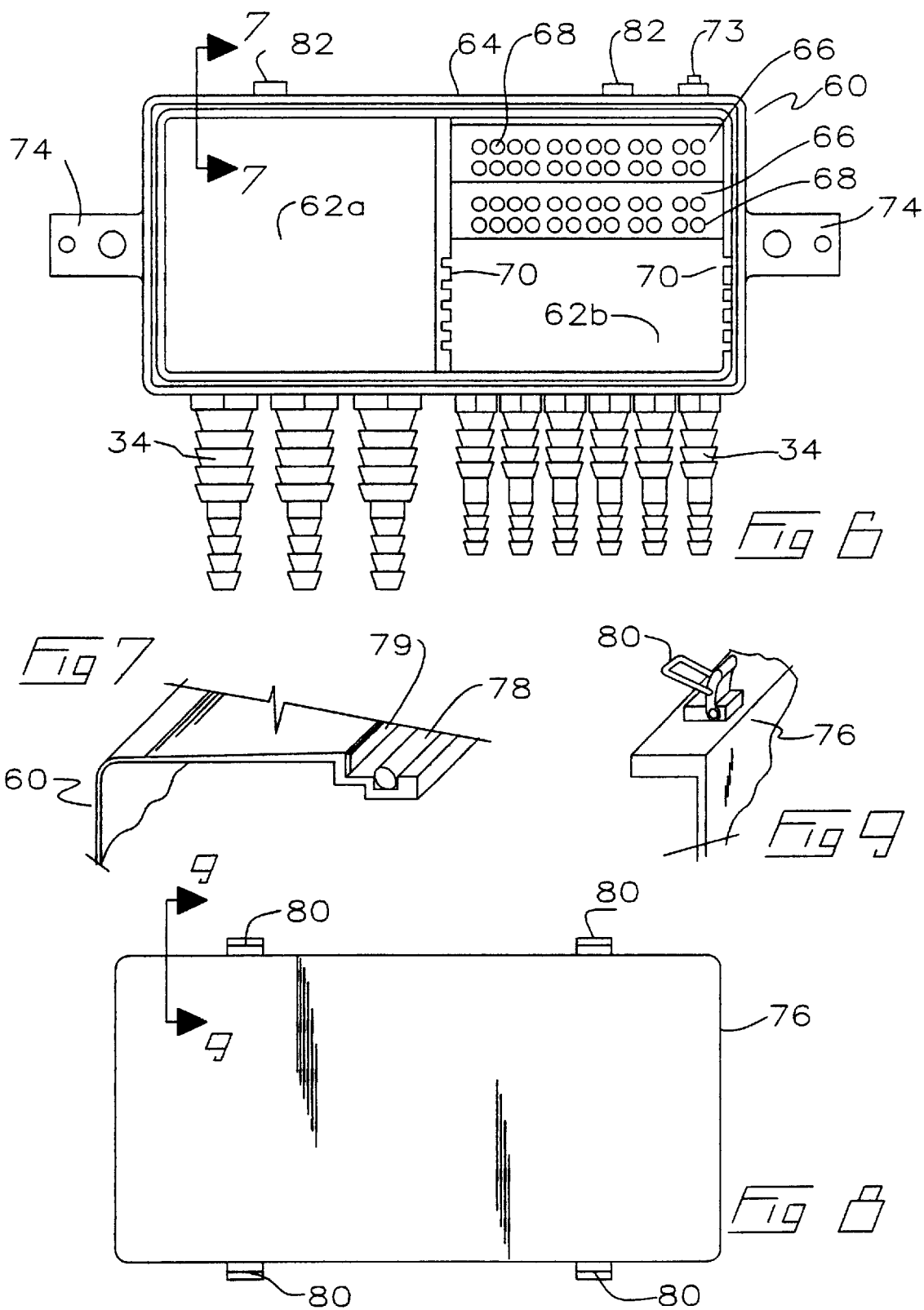

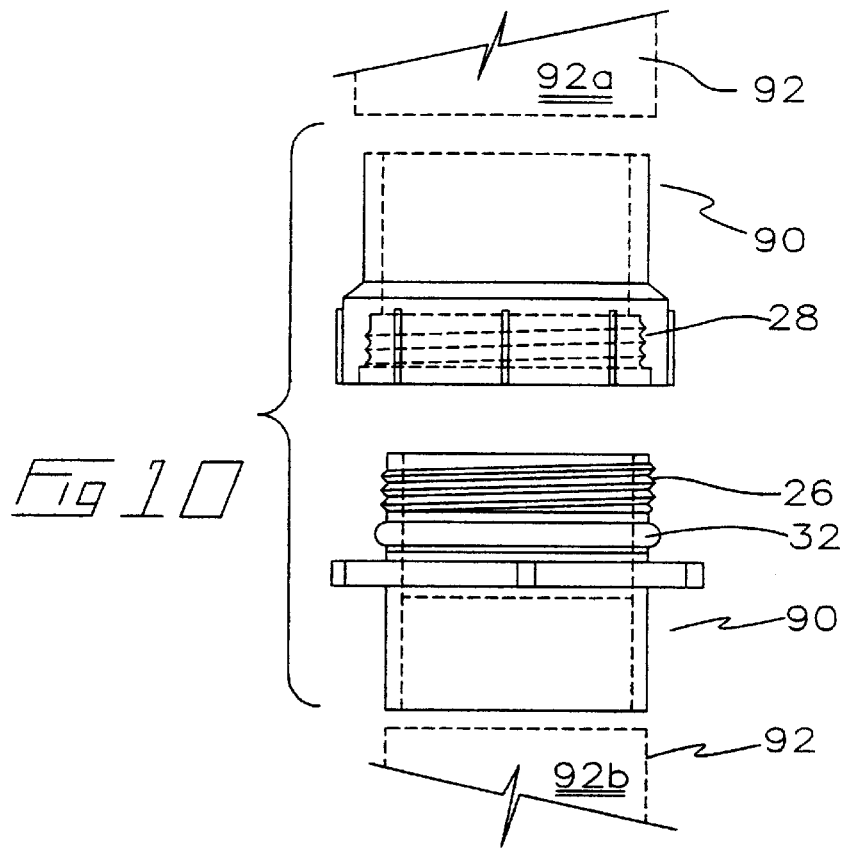
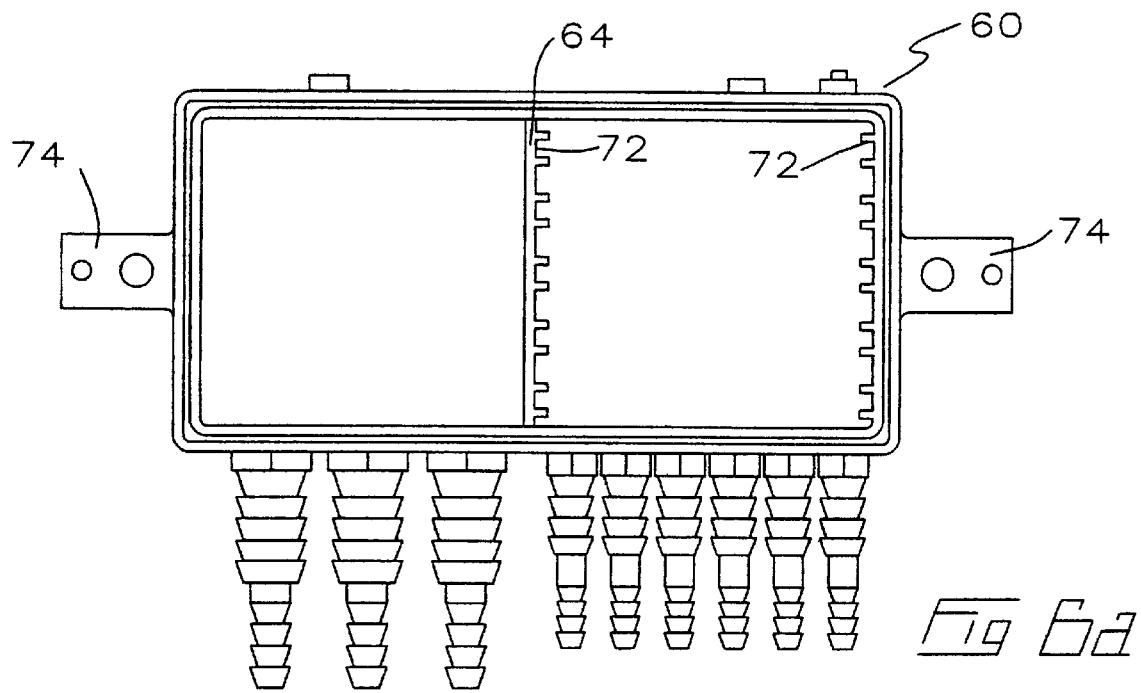

SERVICE WIRE SPLICE HOUSING

CROSS REFERENCE TO RELATED APPLICATION

This Continuation-In-Part application claims priority from U.S. Provisional Patent Application No. 60/019,834 filed Jun. 17, 1996 now abandoned and U.S. patent application No. 08/876,217 filed Jun. 16, 1997 now abandoned titled Service Wire Splice Housing.

FIELD OF THE INVENTION

This invention relates to the field of housings for protecting electrical wire splices and the like from water incursion and for allowing ease of re-entry to the housing by a maintenance or repair worker.

BACKGROUND OF THE INVENTION

Conventionally, telephone service wires from residences must be spliced to a main telephone cable, and such splicing is typically done where the ends of a service wire are collected loosely within a service box. The service box is typically buried to ground level. Typical service boxes are not waterproof, the covers typically being in the manner of conventional manhole covers which may be easily removed and which are just held in place by their weight. Water and other environmental elements typically foul the bottom of the service box where the service wires are left. When it is required to repair or otherwise attend at the service box to splice service wires to the main cable, it is very time consuming for a worker to have to disentangle the service wires fouled in the bottom of the service box, to determine which residential service wire needs attending to (as often the identifying tags or labels become dislodged) and to attempt to make a watertight seal around the splice before replacing the spliced ends back into the bottom of the service box.

It is known in the prior art to provide closeable housings to enclose the spliced ends of the service wire and main telephone cable, to keep the water from getting into the housing, see for example, U.S. Pat. No. 4,337,374. It is known in the prior art to fill such housings with grease and embed the spliced ends into the grease. Because, the grease breaks down, and, if the splice needs to be attended to, not only is it messy but the grease has to be repacked otherwise water will typically get into the housing, these prior art devices are not generally re-used but rather cut-off and thrown away if a splice needs to be re-done. Further, they are generally only considered water resistant rather than waterproof.

Other attempts in the prior art at providing a waterproof seal around spliced ends include the use of butyl tape to wrap around the spliced end.

It is also known in the prior art to provide racks within large manholes, for example, for mounting wires and the like. However, in the prior art it is neither taught nor suggested to provide racks within service boxes for releasable mounting thereto of watertight splice housings.

Applicant's invention is another useful improvement over the plethora of prior art devices, including those of Weagant (U.S. Pat. No. 3,395,382), Ruddell (U.S. Pat. No. 3,209,069), Caulkins (U.S. Pat. No. 3,951,503) and Roney (U.S. Pat. No. 5,347,084), which have attempted a solution to the vexing problem of providing re-usable water tight housings for wire splices.

Weagant, although superficially similar to the present invention as hereinafter described, teaches sealing legs 22 to conductors 10 by means of commercially available heat shrinkable material, whether or not legs 22 are made of such material or whether the heat shrinkable material is dimensioned to slide over the leg so that a conductor passes through the heat shrink sleeve and leg. Specifically, Weagant states starting in column 2, line 1:

> The hermetic seal between the legs and the conductor passing therethrough is accomplished by use of heat shrinkable material. In one embodiment of the invention, the legs which are integral with the one cup-shaped member are made of heat shrinkable material while in another embodiment a sleeve of heat shrinkable material is dimensioned to slide over the leg and a conductor passing therethrough so that upon application of heat the sleeve will shrink onto the leg and conductor and seal the two together.

Weagant further teaches typically using a sealant such as a semi-thermal plastic sealant coated on the inside surface of legs 22. Upon application of heat the sealant softens and the legs shrink onto the conductors so that the sealant flows around the cable and partially out through the contracting ends of the legs forming a permanent mechanical seal (see column 3, lines 15–22). No other method of forming a seal is taught or suggested by Weagant.

For use within the housing, that is, not for use as a seal, Weagant teaches clamping the ends of conductors 10 using mating male and female conical friction clamp components 28 and 34. The clamp components bind the conductors between corresponding notches 30 and 36 in the clamp components 28 and 34. Cylindrical adapters 31 and 37 may be provided to improve the friction fit of the conductors being clamped in the notches. The adapters are located internally of the clamp components and thus do not contribute in any way to the sealing of the housing. The drawback of the Weagant method is that the sealing using heat shrinkable material requires the use of a heat source. To the best of Applicant's knowledge, the use of heat sources for example torches, is prohibited in the United States by many companies for use in confined areas such as man-holes or other underground boxes. However, the splicing which is the subject of the present invention is found in such confined areas. This prohibition is presumably is for safety reasons. Thus, the Weagant method of forming a seal is potentially removed from those methods available to a workman.

The disadvantage in having to use liquid sealing compounds is, as referred to by Ruddell et al. in column 3, line 11, among other things, that a user must wait while the sealing compound sets. A further disadvantage of sealing by welding is, among other things, the causing of noxious fumes and gases in an enclosed space such as in a service box which may pose a safety hazard. What is neither taught nor suggested, and what forms one of the distinguishing features of the present invention as further described below, is the use of the sliding mating of resilient sleeves to elongate tubular service wire receptacles so as to form a watertight seal around service wires without the need for liquid resin or welding or the use of heat shrinkable material requiring the use of a heat source. That is, the method of sealing of the present invention is a mechanical seal. The mechanical seal of the present invention, as it does not require a heat source, is neither taught nor suggested by the application of the Weagant teaching. Specifically, what is neither taught nor suggested, and what is an object of the present invention to provide is the use of resilient sleeves which are not heat shrinkable but rather slidably mountable to hollow cylindrical members such as hose barbs or tubes.

The mechanical sealing of the present invention is also neither taught nor suggested in the teaching of Ruddell et al.

Rather than releasably sliding resilient sleeves so as to mount them to hollow cylindrical members as in the present invention, Ruddell et al disclose embedding a portion of the ends of cable to be joined in casting resin so as to secure the ends to the base section of the container in a water tight manner (column 1, lines 41–44). The base section of the container is closed at one end and apertures are made therein to permit the cables to be inserted into the container. The apertures are subsequently sealed by the casting resin (column 1, lines 60–64). Further, Ruddell et al teach that where one or several of the cables to be joined is polyethylene sheathed, the portion within the tube is preferably heated in an oxidizing flame (column 2, lines 70–72).

Ruddell et al disclose structures superficially resembling hose barbs, namely, adapter sleeves or protrusions 30 seen in FIGS. 4 and 5. Ruddell et al teach that, rather than protrusions 30 being hose barbs:

> The internal sizes of the individual cylindrical protrusions 30 are chosen to correspond to the most used standard cable diameters and, in order to provide as great a selection of cable diameters as possible, a number of sleeves are arranged one above the other to form stepped, projecting hollow cylinders, . . . when a cable has to be inserted into a base section 11 which is provided with these adapter sleeves or protrusions 30, one of the protrusions is cut through at the appropriate place, which corresponds to the diameter of the cable which is to be led into the base section and the cable is inserted through the opening thus formed. In this way a better correspondence between the size of the openings and the size of the cables fitted therein is usually obtained, (column 3, lines 46–61).

Thus, although the cable is to be journalled through the opening in the protrusions 30, there is no suggestion of the use of a resilient sleeve as in the present invention, nor is there any requirement of such a resilient sleeve, Ruddell et al relying on the use of a casting resin to form a water tight seal, sometimes in conjunction with melting the polyethylene sheathing on the cable by the use of an oxidizing flame. The casting resin is a liquid casting resin poured into the base of the tube and allowed to set so as to seal the entry of the cable into the housing (column 3, lines 6–13). Once the resin sets, the joint enclosure is no longer reusable, for example if it is desired to add additional wires to a splice contained within the enclosure. It is also thus apparent that the protrusions 30 of Ruddell et al are not functionally akin to hose barbs such as used in the present invention in that it is neither taught nor suggested in any embodiment of the Ruddell device and method to slide a resilient sleeve over the outside of such a protrusion 30. In the present invention the resilient sleeve may be either slid over the hollow cylindrical member in the member in the manner of a hose barb, or slid into the hollow cylindrical member in the manner of a bushing, depending on the appropriate fit.

Thus it is within the ambit of the present invention for both sliding a resilient sleeve over the hollow cylindrical member and sliding the resilient sleeve into to hollow cylinder member so as to act as a resilient bushing.

SUMMARY OF THE INVENTION

In summary, the service wire splice housing of the present invention includes a rigid, releasably sealable watertight service wire splice enclosure defining a service wire splice receiving cavity for receiving service wire splices therein, wherein a plurality of hollow elongate cylindrical members are mounted to an external surface of the service wire splice enclosure for receiving service wire in journalled relation therethrough. The cylindrical members communicate with the service wire splice receiving cavity so that service wires journalled in the cylindrical members may be passed into the service wire splice receiving cavity. Service wire splice enclosure sealing means, such as an o-ring sealed threaded coupling, provide for releasably securable watertight sealing of the service wire splice enclosure.

Releasably sealable resilient sleeves having first and second ends are slidably mountable at their first ends to the cylindrical members. The resilient sleeves receive service wires journalled therethrough when the first ends of the resilient sleeves are mounted to the cylindrical members.

The resilient sleeves may be mounted to the cylindrical members either by sliding the sleeves partially over the ends of the members, for example so as to use the member in the manner of a hose barb, or by sliding the sleeves snugly into the interior cylindrical passageway of the cylindrical member. The second ends of the resilient sleeves are releasably sealable onto the service wires for watertight sealing of the cylindrical members when the service wires are journalled through the resilient sleeves and through the cylindrical members. The resilient sleeves are not made of heat shrinkable material so that the service wire splice housing of the present invention may be used in enclosed environments where the use of a source of a high temperature flame or air flow, as would be required to shrink "heat shrink" material, might not be safe or permitted.

In one embodiment, the service wire splice enclosure may include an upper cap and a base. The service wire splice receiving cavity is defined therein by a first cavity within the upper cap and a second cavity within the base. A lower aperture in the upper cap communicates with the first cavity. The upper cap releasably securable for watertight releasably resealable mating onto the base. The second cavity extends between an upper aperture corresponding to the lower aperture in the upper cap when the upper cap is releasably mated onto the base, and cylindrical members mounted to an external surface of the base so as to extend from the base. The cylindrical members communicate with the second cavity whereby service wires journalled through the cylindrical members extend into the second cavity in the base and may extend into the first cavity in the upper cap. The service wire splices may thus be enclosed in a dry air volume within the service wire splice receiving cavity.

Advantageously, at least two of the cylindrical members are hose barbs. The cylindrical members may include first, second and third cylindrical members, wherein the third cylindrical member is sealed by a frangible member so as to be watertight.

In a further embodiment, the service wire receptacles may be resilient. Resilient bushing means may also be included for snug sliding fitment into the service wire receptacles or cylindrical members and for snug reception of the service wires journalled therethrough so as to be snugly sandwiched between an interior cylindrical surface of the service wire receptacles or cylindrical members and the service wires. Clamping means for example hose clamps may also be used for clamping the resilient bushing means into releasable watertight sealing engagement around the service wires.

In one aspect, means are provided for supporting at least one fibre optic tray within the cavity in the base so as to support the at least one fibre optic tray within the cap.

In a further aspect, the splice housing is releasably securable to a rigid elongate rack member, wherein the rack member is mountable to a wall within a service box and, advantageously, the rack member has a spaced array of apertures longitudinally therealong for receiving therethrough means for mounting the splice housing to the rack member.

In a further embodiment of the splice housing of the present invention, the splice housing is adapted to receive multiple or numerous splices within a single splice housing. The splice housing may be a rectangular enclosure having a releasably sealable lid mountable thereon, the enclosure having an interior cavity cooperating with a plurality of service wire receptacles mounted to and extending from the housing adapted for journalling service wires through the service wire receptacles and into the cavity, the service wire receptacles providing a watertight seal or providing for watertight sealing around the service wires journalled into the cavity. Within the cavity are mounted or releasably mountable into engagement with interior walls of the housing, means for providing a plurality of splicing of the plurality of the service wires in the cavity. Advantageously, means are provided for supporting in sliding engagement within the housing between the interior housing walls sliding trays for supporting thereon fiber optics.

BRIEF DESCRIPTION OF THE DRAWINGS

FIG. 1 is, in side elevation exploded view, one embodiment of the service wire splice housing of the present invention.

FIG. 1a is the view of FIG. 1 with a resilient coupler sleeve slid over one hose barb and service wire.

FIG. 2 is a view along line 2—2 in FIG. 1, being a bottom plan view of the service wire splice housing of the present invention.

FIG. 2b is a view along line 2b—2b in FIG. 1a.

FIG. 3 is, in side elevation view, a fiber optic tray.

FIGS. 4a and 4b are, in perspective view, alternative embodiments of racks for mounting the service wire splice housings of the present invention within a service box.

FIG. 5 is, in perspective view, a mounting bracket for suspending the racks of FIGS. 4a and 4b within a service box.

FIG. 6 is, in front elevation view, an alternative embodiment of the service wire splice housings of the present invention.

FIG. 6a is a further alternative embodiment of the multiple splice service wire splice housing of FIG. 6.

FIG. 7 is, in enlarged perspective partial view along line 7—7 in FIG. 6, a rim of the multiple splice service wire splice housing of FIG. 6.

FIG. 8 is, in front elevation view, the lid of the multiple splice service wire splice housing of FIG. 6.

FIG. 9 is, in enlarged perspective partial view along line 9—9 in FIG. 8, an edge of the lid of FIG. 8 illustrating a latch.

FIG. 10 is, in exploded elevation view, a splice housing of an alternative embodiment of the present invention.

DETAILED DESCRIPTION OF PREFERRED EMBODIMENTS

Figure 1B:
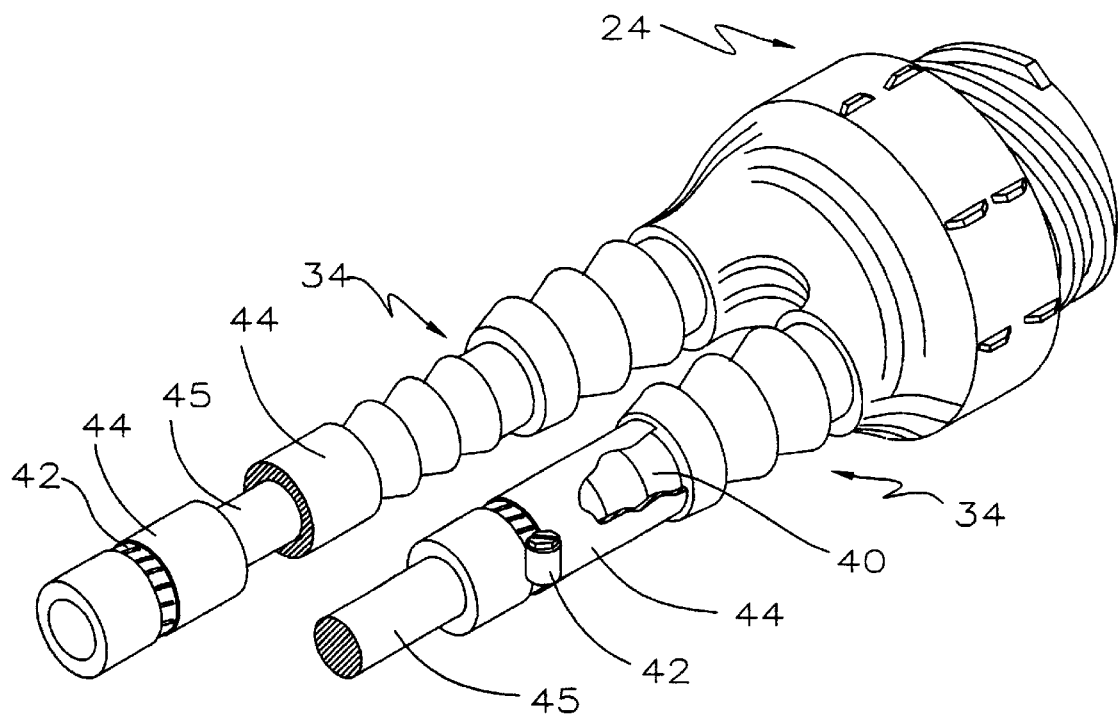
FIG. 1b is, in perspective view, one embodiment of the service wire splice housing of the present invention with a resilient coupler sleeve slid over one hose barb and service wire.

There exists a need in the telephone service industry for a waterproof resealable housing for enclosing splices or the splicable ends of service wire, fibre optics, or the like which does not depend on a grease filling within the housing cavity or a butyl tape seal to accomplish waterproofing of the housing.

Further, there is a need to provide a waterproof housing having in one embodiment two wire entry ports, and in another embodiment, three entry ports so that older cable, i.e. two-pair cable, may be spliced to conventional four-pair wire. A three entry port housing, if the third entry port has a frangible membrane which may be easily broken if a third port is required, may be used for conventional splicing of two two-pair cables to a third four-pair cable.

A conventional service box may be made of fibreglass, concrete or the like. It is typically buried to ground level in most subdivisions where service wire from the residences meet the main telephone cable. The service box typically contains both the main cable and the coiled ends of the service wires lying in the bottom of the service box. The service box typically has a removable cover which is kept in place by its weight in mating engagement with an upper rim of the service box. Typically, the service box cover does not form a waterproof seal with the service box and thus water pools in the bottom of the service box submerging the service wires and the main cable. Also typically, labels which identify the particular service wires from the residences are not firmly attached to the service wires and frequently break off when the service wire is left loosely coiled in the bottom of the service box. The result is that a service technician must then test the service wires to determine which service wire corresponds to which residence.

As illustrated in FIGS. 1, 1a, and 2, the housing 20 of the present invention consists of an upper cap 22 which threads onto a base 24. Cap 22 is releasably resealable onto base 24 by means of threaded internal collar 26 threadably journalling within threaded aperture 28 within cap 22. A watertight seal is accomplished by snug fitment of collar 30 on cap 22 over o-ring seal 32.

Figure 2A:
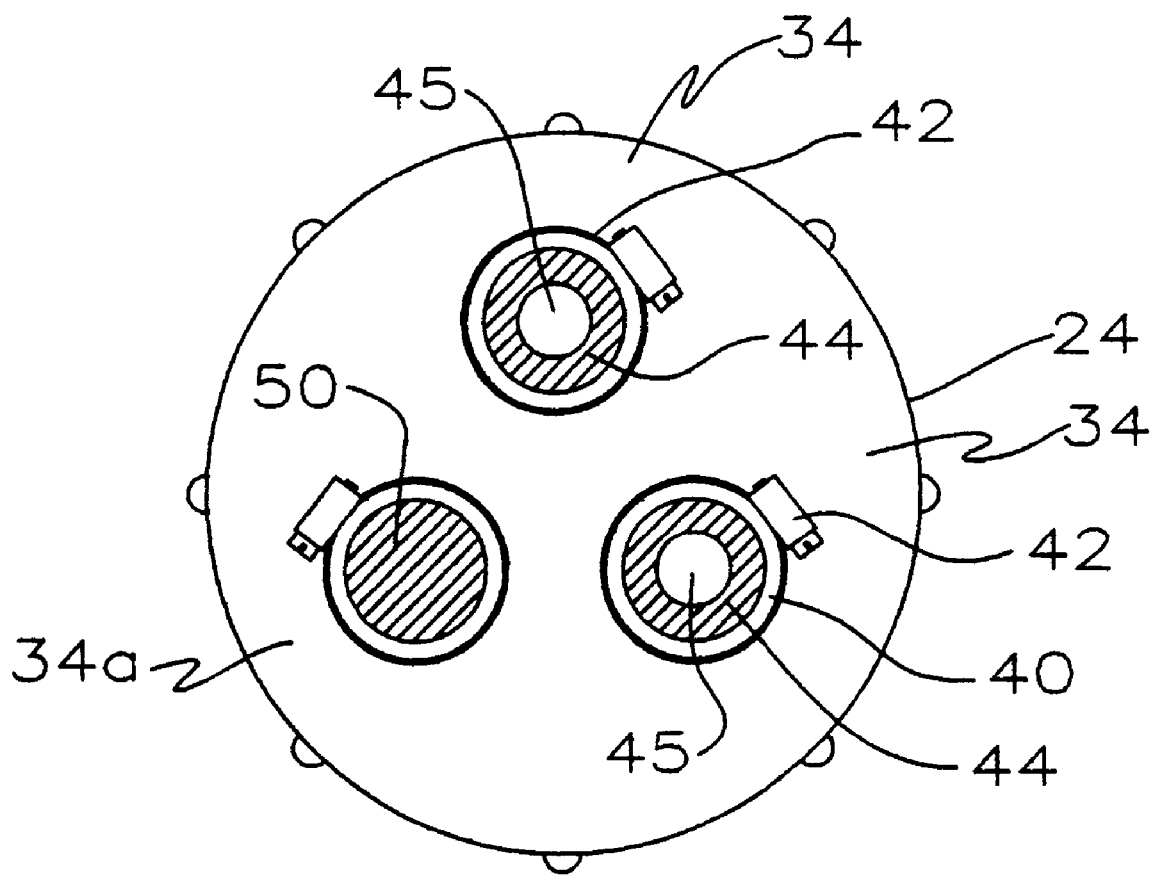
FIG. 2a is, an alternative embodiment of the service wire splice housing of the present invention in bottom plan view with resilient coupler sleeves journalled in corresponding service wire receptacles.

As also seen in FIGS. 1b, 2a and 2b, base 24 is hollow, providing a cavity extending from an open end cooperating with cavity 28 within cap 22 and hollow service wire receptacles 34. Slots 36 (shown in dotted outline in FIG. 1) in the open end of base 24 cooperating with cavity 28 in cap 22 may be provided for supporting therein conventional fibre optics trays 38 shown in FIG. 3. Fibre optic trays 38 may be thereby supported within cavity 28 in cap 22.

Base 24 may be of moulded plastic or other mouldable or resilient material. Hose barbs 40 on service wire receptacles 34 may be formed as part of base 24, and ribbed as illustrated, or may be separate members such as pieces of resilient tubing which may be mounted or affixed to corresponding apertures within base 24. Advantageously, hose barbs 40 are ribbed so that by means of hose clamps 42 or the like, hose barbs 40 and resilient sleeves or tubes 44 (which may be rubber tubing or the like) may be fitted snugly around a service wire 45 journalled therethrough and the outer casing and resilient sleeve 44 pinched for example, by hose clamp 42 around the service wire so as to provide a watertight seal.

Thus in operation service wires 45 are pushed through, so as to be journalled in, resilient sleeves 44 when the resilient sleeves are mounted on or in service wire receptacles 34 so as to extend services wires 45 into cavity 28 in cap 22 when cap 22 is threaded onto base 24.

The resilient sleeves 44 may be slid over the hose barbs 40 as seen in FIGS. 1a and 1b, or as seen in FIG. 2a may be journalled along with the service wires 45 into the outer casing 40, whether or not the service wire receptacles 34 have hose barbs 40 formed thereon. The use of either option will depend on which gives the best sealing fit over the service wires once the resilient sleeve is clamped.

Housing 20 may then be mounted to the sides of a service box by means of racks 46 seen in two embodiments in FIGS. 4a and 4b. Racks 46 may be directly fastened through apertures 46a to the walls of a service box, or may be suspended from the rim of a service box by means of mounting bracket 47 seen in FIG. 5. Bolts 47a mount through apertures 46a. Strapping may be used to strap base 24, around external grooved collar 48 and through eyelets 46b so as to releasably secure base 24 against rack 46. Service wire tags may be left on the service wire protruding beneath service wire receptacles 34 or may be attached to the service wire within cavity 28 within cap 22.

When it is desired to splice telephone wires, cap 22 is unthreaded from base 24 uncovering service wires at their splicable ends. Cap 22 may be threaded and resealed back onto base 24 once the maintenance work has been completed and a watertight seal will then be resealed in housing 20 by O-ring 32 without the need for applying grease inside cavity 28.

Base 24 may have a third service wire receptacle 34a which is sealed by means of frangible membrane 50. If it is required or desired to, for example, splice two two-pair wires to a third four-pair wire then service wire receptacle 34a may be used by simply breaking frangible membrane 50 by using a screwdriver or the like. Once frangible membrane 50 is ruptured, service wire receptacle 34a may be used in the same manner as service wire receptacles 34.

Rack 46 may also be used to mount prior art splice housings and the main telephone cable along the upper sides of a service box.

Advantageously, in the preferred embodiment, cap 22 is approximately 3 inches in height and 2½ inches wide, and base 24 is approximately 4½ inches in length (including the upper threaded portion) and approximately 2½ inches wide at groove collar 48. Hose barbs 40 may have an outside diameter of approximately ¾ inches.

In the alternative embodiments seen in FIGS. 6 and 6a, a multiple splice housing 60 is provided, in the form of a generally rectangular enclosure as illustrated, although whether the enclosure is rectangular or shaped otherwise is within the scope of the present invention. Service wire receptacles 34 are provided for watertight sealing in their manner described above. Service wire is journalled through service wire receptacles 34 and into housing cavity 62a and 62b. Housing cavities 62a and 62b are separated by divider 64. Divider 64 has at least one aperture therein for passing service wires between cavities 62a and 62b. Snap-in posts 66, releasably mountable between divider 64 and a wall of housing 60, have copper wire terminal posts 68 or the like mounted thereon for splicing service wires. Opposed pairs of grooves 70 may be provided in divider 64 and an opposed interior wall of housing 60 for receiving therein in sliding engagement sliding trays for fiber optics. In an alternative embodiment, divider 64 and corresponding interior side walls of housing 60 have opposed pairs of channels 72 for mounting therein in sliding engagement sliding trays for fiber optics or sliding splice bars for splicing service wires. Pressure test valve 73 may be provided to pressure test the seal of a sealed housing 60.

Multiple splice housing 60 may be mounted to the wall of a service box by means of mounting flanges 74. A resealable watertight lid 76 is provided for releasable sealing of housing 60 as seen in FIG. 8. A watertight seal is provided by O-ring 78 and rubber gasket 79 better seen in FIG. 7, lid 76 releasably secured by means of latches 80, as seen in FIG. 9, engaging flanges 82.

As seen in FIG. 10, a housing 90, similar in structure and purpose to housing 20, may be provided to releasably couple sections 92a and 92b of heat shrink boot 92 shown in dotted outline. Normally heat shrink boots 92, manufactured by Ray Chem, are used to enclosure the main cable splice in a service box. These boots, although expensive, are not reusable in that their usefulness is destroyed when they are removed. By incorporating housing 90, one end of the boot 92, for example section 92a, is shrunk onto the main cable, and section 92b is only shrunk onto the corresponding portion of housing 90, leaving the rest of section 92b unshrunk so that it may be slid off the splices. The splices may then be dealt with and section 92b replaced over the splices and housing 90 recoupling to seal the splice housing. As in housing 20, in housing 90, threaded coupling 26 and 28 and O-ring 32 seal the sections of housing 90. This would not necessarily entail the use of a heat source within the confined space of a service box, as would be known to one skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A service wire splice housing comprising
    a rigid, releasably sealable watertight service wire splice enclosure defining, a service wire splice receiving cavity for receiving service wire splices therein,
    a plurality of hollow elongate cylindrical members mounted to an external surface of said service wire splice enclosure for receiving service wires in journalled relation therethrough, said cylindrical members communicating with said service wire splice receiving cavity so that said service wires journalled in said cylindrical members may be passed into said service wire splice receiving cavity,
    service wire splice enclosure sealing means for releasably securable watertight sealing of said service wire splice enclosure,
    releasably sealable resilient sleeves having first and second ends, slidably mountable at said first ends to said cylindrical members, said resilient sleeves for receiving said service wires journalled therethrough when said first ends of said resilient sleeves are mounted to said cylindrical members, said second ends of said resilient sleeves releasably sealable onto said service wires when said service wires are journalled through said resilient sleeves and said cylindrical members for watertight sealing of said cylindrical members,
    wherein said resilient sleeves are not heat shrinkable, and wherein said sleeves are mountable to said elongate cylindrical members by snug resilient sliding of said sleeves over said hollow elongate cylindrical members.

2. The service wire splice housing of claim 1 further comprising means for mounting at least one fiber optic tray within said service wire splice receiving cavity.

3. The service wire splice housing of claim 1 wherein said splice housing is adapted to receive multiple splices within a single splice housing.

4. The service wire splice housing of claim 3 wherein said splice housing is a generally box-like enclosure having a releasably sealable lid mountable thereon, said service wire splice receiving cavity cooperating with a plurality of said service wire receptacles mounted to and extending from said enclosure.

5. The service wire splice housing of claim 4 further comprising, within said cavity, mountable into engagement with interior walls of said enclosure means for providing a plurality of splicing of said plurality of said service wires in said service wire splice receiving cavity.

6. The service wire splice housing of claim 5 wherein said means for providing a plurality of splicing of said plurality of said service wires in said service wire splice receiving cavity are rigid members having releasably securable terminal posts mounted thereon.

7. The service wire splice housing of claim 6 further comprising means for supporting in sliding engagement within said enclosure, between said interior walls, sliding trays for mounting fiber optics thereon.

8. The service wire splice housing of claim 1 wherein said elongate cylindrical members are hose barbs.

9. A service wire splice housing comprising
a rigid, releasably sealable watertight service wire splice enclosure defining a service wire splice receiving cavity for receiving service wire splices therein,
a plurality of hollow elongate cylindrical members mounted to an external surface of said service wire splice enclosure for receiving service wires in journalled relation therethrough, said cylindrical members communicating with said service wire splice passed into said service wire splice receiving cavity,
service wire splice enclosure sealing means for releasably securable watertight sealing of said service wire splice enclosure,
releasably sealable resilient sleeves having first and second ends, slidably mountable at said first ends to said cylindrical members, said resilient sleeves for receiving said service wires journalled therethrough when said first ends of said resilient sleeves are mounted to said cylindrical members, said second ends of said resilient sleeves releasably sealable onto said service wires when said service wires are journalled through said resilient sleeves and said cylindrical members for watertight sealing of said cylindrical members,
wherein said resilient sleeves are not heat shrinkable,
and wherein said sleeves are mountable to said elongate cylindrical members by snug resilient sliding of said sleeves over said hollow elongate cylindrical members.

10. The service wire splice housing of claim 9 wherein said service wire splice enclosure comprises an upper cap and a base, said service wire splice receiving cavity defined therein, said service wire receiving cavity comprising a first cavity within said upper cap and a second cavity within said base, a lower aperture in said upper cap communicating with said first cavity, said upper cap releasably securable for watertight releasably resealable mating onto said base, said second cavity extending between an upper aperture corresponding to said lower aperture in said upper cap when said upper cap is releasably mated onto said base, said cylindrical members mounted to an external surface of said base so as to extend from said base, said cylindrical members communicating with said second cavity whereby said service wires journalled through said cylindrical members extend into said second cavity in said base and into said first cavity in said upper cap wherein said service wire splices may be enclosed in a dry air volume within said service wire splice receiving cavity.

11. The service wire splice housing of claim 10 wherein at least two of said cylindrical members wire hose barbs.

12. The service wire splice housing of claim 11 wherein said plurality of hollow elongate cylindrical members comprise first, second and third cylindrical members, wherein said third cylindrical member is sealed by a frangible member so as to be watertight.

* * * * *